(12) United States Patent
Gombert et al.

(10) Patent No.: US 11,292,522 B2
(45) Date of Patent: Apr. 5, 2022

(54) SPLAYED FRONT HORNS FOR VEHICLE FRAMES

(71) Applicant: Ford Global Technologies, LLC, Dearborn, MI (US)

(72) Inventors: Greg Gombert, Canton, MI (US); Jeffrey A. Walesch, Canton, MI (US); Leonard Anthony Shaner, New Baltimore, MI (US); Yu-Kan Hu, Ypsilanti, MI (US); Mikolaj Tyksinski, Dearborn, MI (US); Sukhwinder Singh Dhindsa, Windsor (CA); Mohamed Ridha Baccouche, Ann Arbor, MI (US); Srinivasan Sundararajan, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 16/703,727

(22) Filed: Dec. 4, 2019

(65) Prior Publication Data
US 2021/0171108 A1    Jun. 10, 2021

(51) Int. Cl.
*B62D 21/15* (2006.01)
*B62D 27/02* (2006.01)
*B62D 29/00* (2006.01)

(52) U.S. Cl.
CPC ......... *B62D 21/152* (2013.01); *B62D 21/155* (2013.01); *B62D 27/023* (2013.01); *B62D 29/007* (2013.01)

(58) Field of Classification Search
CPC ...... B62D 21/155; B62D 21/06; B62D 21/02; B62D 21/15; B62D 21/152; B62D 21/157; B62D 21/023; B62D 25/2018; B62D 25/08; B62D 25/082; B62D 27/023
USPC ............. 296/203.01, 203.02, 187.09, 187.1, 296/193.09, 204; 293/133
See application file for complete search history.

(56) References Cited

U.S. PATENT DOCUMENTS

| | | |
|---|---|---|
| 1,951,292 A | 3/1934 | Cahill |
| 2,205,893 A | 6/1940 | Unger |
| 2,340,003 A | 1/1944 | McDermott |

(Continued)

FOREIGN PATENT DOCUMENTS

| | | |
|---|---|---|
| CN | 104443039 | 3/2015 |
| CN | 104763772 | 7/2015 |

(Continued)

OTHER PUBLICATIONS

Bitzer, "Honeycomb Technology, Materials, Design, Manufacturing, Applications and Testing," Springer-Science + Business Media, B.V., 1997, 243 pages.

(Continued)

*Primary Examiner* — Dennis H Pedder
(74) *Attorney, Agent, or Firm* — Ray Coppiellie; Hanley, Flight & Zimmerman, LLC

(57) ABSTRACT

Splayed front horn for vehicle frames are disclosed. An example apparatus includes a frame of a vehicle having a side rail directed in a longitudinal direction of the vehicle and a splayed front horn coupled to the side rail, the splayed front horn angled outward relative to the longitudinal direction of the vehicle, wherein the splayed front horn includes a first section and a second section, the first and second sections having different physical properties.

20 Claims, 10 Drawing Sheets

(56) References Cited

U.S. PATENT DOCUMENTS

| | | |
|---|---|---|
| 2,837,347 A | 6/1958 | Barenyi |
| 2,856,226 A | 10/1958 | Purdy |
| 3,092,222 A | 6/1963 | Heinle |
| 3,209,432 A | 10/1965 | Cape |
| 3,366,530 A | 1/1968 | Kodich |
| 3,412,628 A | 11/1968 | De Gain |
| 3,640,798 A | 2/1972 | Deeds |
| 3,930,658 A | 1/1976 | Howe et al. |
| 3,950,202 A | 4/1976 | Hodges |
| 3,964,527 A | 6/1976 | Zwart |
| 3,991,245 A | 11/1976 | Jackson |
| 4,018,055 A | 4/1977 | Le Clercq |
| 4,021,983 A | 5/1977 | Kirk, Jr. |
| 4,029,350 A | 6/1977 | Goupy et al. |
| 4,056,878 A | 11/1977 | Woodley |
| 4,135,018 A | 1/1979 | Bonin et al. |
| 4,152,012 A * | 5/1979 | Reidelbach .......... B62D 21/152 280/784 |
| 4,227,593 A | 10/1980 | Bricmont et al. |
| 4,249,976 A | 2/1981 | Hudson |
| 4,352,484 A | 10/1982 | Gertz et al. |
| 4,364,216 A | 12/1982 | Koller |
| 4,667,530 A | 5/1987 | Mettler et al. |
| 4,702,515 A | 10/1987 | Kato et al. |
| 4,833,029 A | 5/1989 | DuPont et al. |
| 5,069,318 A | 12/1991 | Kulesha et al. |
| 5,100,730 A | 3/1992 | Lambers |
| 5,242,735 A | 9/1993 | Blankenburg et al. |
| 5,271,204 A | 12/1993 | Wolf et al. |
| 5,431,445 A | 7/1995 | Wheatley |
| 5,431,980 A | 7/1995 | McCarthy |
| 5,480,189 A | 1/1996 | Davies et al. |
| 5,618,633 A | 4/1997 | Swanson et al. |
| 5,729,463 A | 3/1998 | Koenig et al. |
| 5,913,565 A | 6/1999 | Watanabe |
| 6,068,330 A | 5/2000 | Kasuga et al. |
| 6,179,355 B1 | 1/2001 | Chou et al. |
| 6,371,540 B1 | 4/2002 | Campanella et al. |
| 6,523,576 B2 | 2/2003 | Imaeda et al. |
| 6,588,830 B1 | 7/2003 | Schmidt et al. |
| 6,635,202 B1 | 10/2003 | Bugg et al. |
| 6,705,653 B2 | 3/2004 | Gotanda et al. |
| 6,752,451 B2 | 6/2004 | Sakamoto et al. |
| 6,799,794 B2 | 10/2004 | Mochidome et al. |
| 6,820,924 B2 * | 11/2004 | Caliskan ................ B62D 21/15 188/377 |
| 6,893,065 B2 | 5/2005 | Saksaria et al. |
| 6,899,195 B2 * | 5/2005 | Miyasaka ............ B62D 21/152 180/312 |
| 6,957,846 B2 * | 10/2005 | Saeki ................... B62D 21/152 180/232 |
| 6,959,894 B2 | 11/2005 | Hayashi |
| 7,044,515 B2 | 5/2006 | Mooijman et al. |
| 7,160,621 B2 | 1/2007 | Chaudhari et al. |
| 7,252,314 B2 | 8/2007 | Tamura et al. |
| 7,264,274 B2 | 9/2007 | Ridgway et al. |
| 7,303,219 B2 | 12/2007 | Trabant et al. |
| 7,350,851 B2 | 4/2008 | Barvosa-Carter et al. |
| 7,357,445 B2 | 4/2008 | Gross et al. |
| 7,407,219 B2 | 8/2008 | Glasgow et al. |
| 7,445,097 B2 | 11/2008 | Tamura et al. |
| 7,678,440 B1 | 3/2010 | McKnight et al. |
| 7,695,052 B2 * | 4/2010 | Nusier ................. B62D 21/152 296/187.09 |
| 7,896,411 B2 | 3/2011 | Kano et al. |
| 7,926,160 B2 | 4/2011 | Zifferer et al. |
| 7,926,865 B2 | 4/2011 | Terada et al. |
| 7,988,809 B2 | 8/2011 | Smith et al. |
| 8,336,933 B2 | 12/2012 | Nagwanshi et al. |
| 8,354,175 B2 | 1/2013 | Impero |
| 8,438,808 B2 | 5/2013 | Carlson et al. |
| 8,459,726 B2 | 6/2013 | Tyan et al. |
| 8,469,416 B2 | 6/2013 | Haneda et al. |
| 8,539,737 B2 | 9/2013 | Tyan et al. |
| 8,573,571 B2 | 11/2013 | Langhorst et al. |
| 8,641,129 B2 | 2/2014 | Tyan et al. |
| 8,659,659 B2 | 2/2014 | Bradai et al. |
| 8,863,634 B1 | 10/2014 | Lou |
| 9,073,582 B2 | 7/2015 | Tyan et al. |
| 9,174,678 B2 | 11/2015 | Tyan et al. |
| 9,187,127 B2 * | 11/2015 | Tyan ................... B62D 21/152 |
| 9,327,664 B2 | 5/2016 | Ishitobi et al. |
| 9,365,245 B2 | 6/2016 | Donabedian et al. |
| 9,533,710 B2 | 1/2017 | Cheng et al. |
| 9,789,906 B1 | 10/2017 | Tyan |
| 9,840,281 B2 | 12/2017 | Tyan et al. |
| 9,845,112 B2 | 12/2017 | Tyan et al. |
| 9,889,887 B2 | 2/2018 | Tyan et al. |
| 9,944,323 B2 | 4/2018 | Tyan et al. |
| 10,220,881 B2 | 3/2019 | Tyan et al. |
| 10,279,842 B2 | 5/2019 | Tyan et al. |
| 10,300,947 B2 | 5/2019 | Tyan |
| 10,315,698 B2 | 6/2019 | Tyan et al. |
| 10,393,315 B2 | 8/2019 | Tyan |
| 10,611,409 B2 | 4/2020 | Tyan et al. |
| 10,704,638 B2 | 7/2020 | Tyan et al. |
| 10,948,000 B2 | 3/2021 | Tyan |
| 2002/0059087 A1 | 5/2002 | Wahlbin et al. |
| 2002/0153719 A1 | 10/2002 | Taguchi |
| 2003/0085592 A1 | 5/2003 | Seksaria et al. |
| 2005/0028710 A1 | 2/2005 | Carpenter et al. |
| 2006/0033363 A1 | 2/2006 | Hillekes et al. |
| 2006/0181072 A1 | 8/2006 | Tamura et al. |
| 2006/0202493 A1 | 9/2006 | Tamura et al. |
| 2006/0202511 A1 | 9/2006 | Tamura et al. |
| 2006/0237976 A1 | 10/2006 | Glasgow et al. |
| 2006/0249342 A1 | 11/2006 | Canot et al. |
| 2007/0056819 A1 | 3/2007 | Kano et al. |
| 2007/0114804 A1 | 5/2007 | Gross et al. |
| 2008/0012386 A1 | 1/2008 | Kano et al. |
| 2008/0014809 A1 | 1/2008 | Brown et al. |
| 2008/0030031 A1 | 2/2008 | Nilsson |
| 2008/0036242 A1 | 2/2008 | Glance et al. |
| 2008/0098601 A1 | 5/2008 | Heinz et al. |
| 2008/0106107 A1 | 5/2008 | Tan et al. |
| 2008/0164864 A1 | 7/2008 | Bjorn |
| 2008/0185852 A1 | 8/2008 | Suzuki et al. |
| 2008/0217935 A1 | 9/2008 | Braunbeck et al. |
| 2009/0026777 A1 | 1/2009 | Schmid et al. |
| 2009/0064946 A1 | 3/2009 | Watson |
| 2009/0085362 A1 | 4/2009 | Terada et al. |
| 2009/0092820 A1 | 4/2009 | Lambers |
| 2009/0102234 A1 | 4/2009 | Heatherington et al. |
| 2009/0174219 A1 | 7/2009 | Foreman |
| 2009/0236166 A1 | 9/2009 | Kowaki et al. |
| 2010/0066124 A1 | 3/2010 | Terada et al. |
| 2010/0072788 A1 | 3/2010 | Tyan et al. |
| 2010/0102592 A1 | 4/2010 | Tyan et al. |
| 2010/0164238 A1 | 7/2010 | Nakanishi et al. |
| 2011/0012389 A1 | 1/2011 | Kanaya et al. |
| 2011/0015902 A1 | 1/2011 | Cheng et al. |
| 2011/0024250 A1 | 2/2011 | Kitashiba et al. |
| 2011/0102592 A1 | 5/2011 | Bradai et al. |
| 2011/0187135 A1 | 8/2011 | Kano et al. |
| 2011/0223372 A1 | 9/2011 | Metz et al. |
| 2011/0226312 A1 | 9/2011 | Bohm et al. |
| 2012/0205927 A1 | 8/2012 | Asakawa et al. |
| 2012/0261949 A1 | 10/2012 | Tyan et al. |
| 2013/0140850 A1 | 6/2013 | Tyan et al. |
| 2013/0193699 A1 | 8/2013 | Zannier |
| 2013/0221692 A1 | 8/2013 | Wang et al. |
| 2013/0264757 A1 | 10/2013 | Rajasekaran et al. |
| 2013/0292968 A1 | 11/2013 | Tyan et al. |
| 2013/0300138 A1 | 11/2013 | Banasiak et al. |
| 2013/0341115 A1 | 12/2013 | Tyan et al. |
| 2014/0021709 A1 | 1/2014 | Hirose et al. |
| 2014/0127454 A1 | 5/2014 | Küppers |
| 2014/0203577 A1 | 7/2014 | Nagwanshi et al. |
| 2014/0227928 A1 | 8/2014 | Ehbing et al. |
| 2014/0261949 A1 | 9/2014 | Marella et al. |
| 2014/0353990 A1 | 12/2014 | Ishitobi et al. |
| 2015/0001866 A1 | 1/2015 | Noyori |
| 2015/0084374 A1 | 3/2015 | Tyan et al. |

(56) References Cited

U.S. PATENT DOCUMENTS

| | | | |
|---|---|---|---|
| 2015/0197206 A1 | 7/2015 | Tamura et al. |
| 2015/0247298 A1 | 9/2015 | Li et al. |
| 2015/0314743 A1 | 11/2015 | Matsushiro |
| 2016/0001726 A1 | 1/2016 | Keller et al. |
| 2016/0011725 A1 | 1/2016 | Nakanishi et al. |
| 2016/0052557 A1 | 2/2016 | Tyan et al. |
| 2016/0068194 A1 | 3/2016 | Tyan et al. |
| 2016/0129866 A1 | 5/2016 | Kamiya |
| 2016/0221521 A1 | 8/2016 | Nishimura et al. |
| 2016/0264083 A1 | 9/2016 | Ishitsuka |
| 2016/0332410 A1 | 11/2016 | Brun |
| 2016/0375935 A1 | 12/2016 | Tyan et al. |
| 2017/0106915 A1 | 4/2017 | Tyan et al. |
| 2017/0113724 A1 | 4/2017 | Tyan et al. |
| 2017/0182730 A1 | 6/2017 | Kendrick et al. |
| 2017/0203790 A1 | 7/2017 | Tyan et al. |
| 2017/0274933 A1 | 9/2017 | Tyan |
| 2017/0282484 A1 | 10/2017 | Dietz et al. |
| 2017/0307138 A1 | 10/2017 | Tyan |
| 2018/0057058 A1 | 3/2018 | Tyan |
| 2018/0057060 A1 | 3/2018 | Tyan et al. |
| 2018/0057063 A1 | 3/2018 | Tyan et al. |
| 2018/0058530 A1 | 3/2018 | Tyan |
| 2018/0099475 A1 | 4/2018 | Tyan et al. |
| 2018/0100621 A1 | 4/2018 | Tyan et al. |
| 2019/0248415 A1 | 8/2019 | Tyan et al. |

FOREIGN PATENT DOCUMENTS

| | | |
|---|---|---|
| CN | 104890308 | 9/2015 |
| CN | 105235616 | 1/2016 |
| DE | 102005037055 | 2/2007 |
| DE | 102009035782 | 3/2010 |
| EP | 0856681 | 8/1998 |
| FR | 2375496 | 7/1978 |
| GB | 1123337 | 8/1968 |
| JP | 8337183 | 12/1996 |
| JP | 2007023661 | 2/2007 |
| JP | 3897542 | 3/2007 |
| JP | 2008168745 | 7/2008 |
| JP | 2008261493 | 10/2008 |
| JP | 2009184417 | 8/2009 |
| JP | 4371059 | 11/2009 |
| JP | 2011051581 | 3/2011 |
| JP | 2012107660 | 6/2012 |
| JP | 2013159132 | 8/2013 |
| JP | 5348910 | 11/2013 |
| JP | 2014004973 | 1/2014 |
| JP | 2015124784 | 7/2015 |
| RU | 2246646 | 2/2005 |
| WO | 199209766 | 6/1992 |
| WO | 2014177132 | 11/2014 |

OTHER PUBLICATIONS

Dupont "Nomex 410 Technical Data Sheet," 2016, 8 pages.

Nakazawa et al., "Development of Crash-Box for Passenger Car with High Capacity for Energy Absorption," VIII International Conference on Computational Plasticity (Complas VIII), 2005, 4 pages.

Poonaya et al., "Comparison of Energy Absorption of Various Section Steel Tubes under Axial Compression and Bending Loading," The $21^{st}$ Conference of Mechanical Engineering Network of Thailand, Oct. 17-19, 2007, 4 pages.

Fyllingen et al., "Simulations of a Top-Hat Section Subjected to Axial Crushing Taking into Account Material and Geometry Variations," International Journal of Solids and Structures 45, 2008, 15 pages.

Najafi et al., "Mechanics of Axial Plastic Collapse in Multi-Cell, Multi-Corner Cmsh Tubes," Thin-Walled Structures 49 (2011), pp. 1-12, available 2010, 12 pages.

Palanivelu et al., "Comparison of the Cmshing Performance of Hollow and Foam-Filled Small-Scale Composite Tubes with Different Geometrical Shapes for use in Sacrificial Cladding Stmctures," Composites: Part B 41 (2010), pp. 434-445, 12 pages.

Yamashita et al., "Quasi-Static and Dynamic Axial Cmshing of Various Polygonal Tubes," Key Engineering Materials vols. 340-341 (2007), pp. 1399-1404, 2007, 7 pages.

Zhang, "Crushing Analysis of Polygonal Columns and Angle Elements," International Journal of Impact Engineering, 37 (2010), pp. 441-451, first available Jun. 2009, 11 pages.

United States Patent and Trademark Office, "Restriction Requirement," dated Mar. 22, 2018 in connection with U.S. Appl. No. 15/138,465, 8 pages.

United States Patent and Trademark Office, "Non-Final Office Action," dated Sep. 26, 2018 in connection with U.S. Appl. No. 15/138,465, 9 pages.

United States Patent and Trademark Office, "Non-Final Office Action," dated Jul. 8, 2019 in connection with U.S. Appl. No. 15/138,465, 7 pages.

United States Patent and Trademark Office, "Notice of Allowance," dated Mar. 21, 2019 in connection with U.S. Appl. No. 15/138,465, 9 pages.

United States Patent and Trademark Office, "Supplemental Notice of Allowability," dated Jun. 11, 2019 in connection with U.S. Appl. No. 15/138,465, 3 pages.

United States Patent and Trademark Office, "Notice of Allowance," dated Jan. 15, 2020 in connection with U.S. Appl. No. 15/13 8,465, 5 pages.

United States Patent and Trademark Office, "Non-Final Office Action," dated Mar. 4, 2019 in connection with U.S. Appl. No. 15/838,148, 5 pages.

United States Patent and Trademark Office, "Final Office Action," dated Sep. 19, 2019 in connection with U.S. Appl. No. 15/838,148, 9 pages.

United States Patent and Trademark Office, "Notice of Allowance," dated Dec. 3, 2019 in connection with U.S. Appl. No. 15/838,148, 8 pages.

United States Patent and Trademark Office, "Restriction Requirement," dated Jul. 18, 2019 in connection with U.S. Appl. No. 16/391,652, 5 pages.

United States Patent and Trademark Office, "Non-Final Office Action," dated Sep. 27, 2019 in connection with U.S. Appl. No. 16/391,652, 8 pages.

United States Patent and Trademark Office, "Non-Final Office Action," dated Jul. 31, 2020 in connection with U.S. Appl. No. 16/508,569, 19 pages.

United States Patent and Trademark Office, "Notice of Allowance," dated Dec. 2, 2020 in connection with U.S. Appl. No. 16/508,569, 8 pages.

* cited by examiner

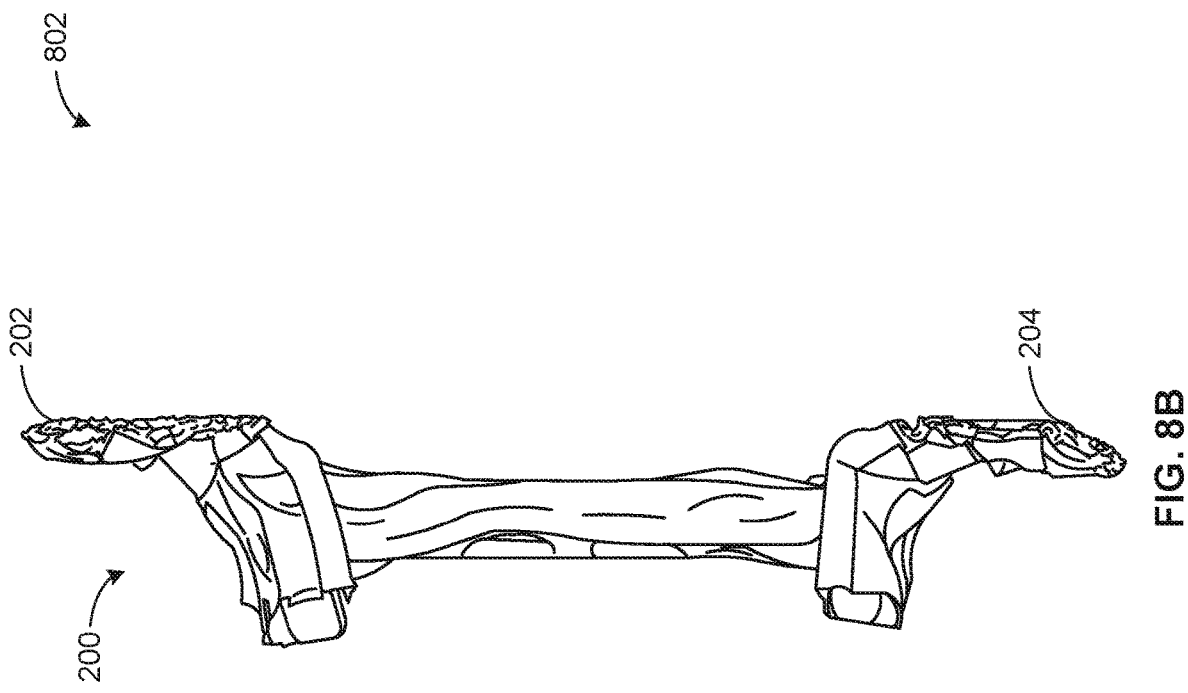
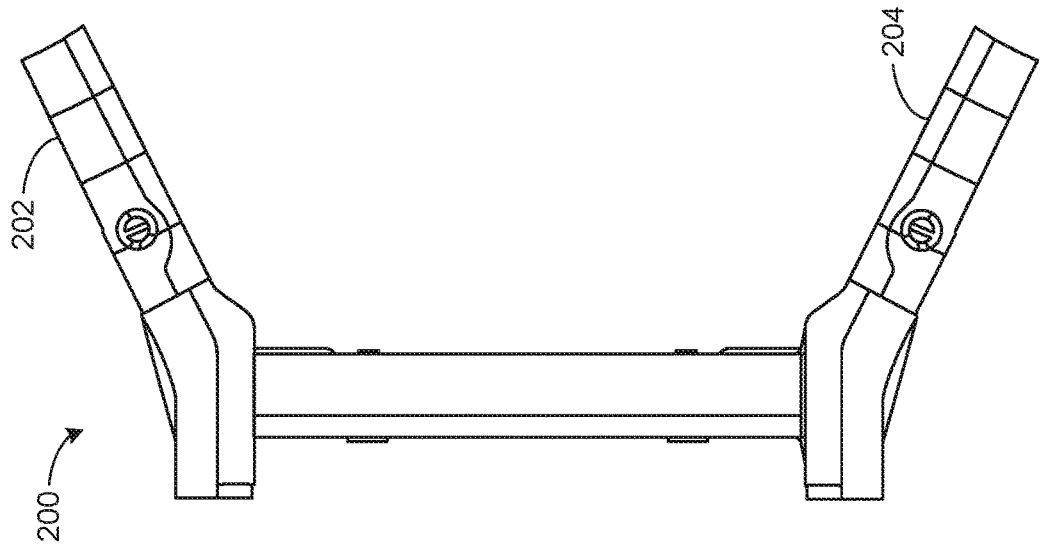
FIG. 8B
FIG. 8A

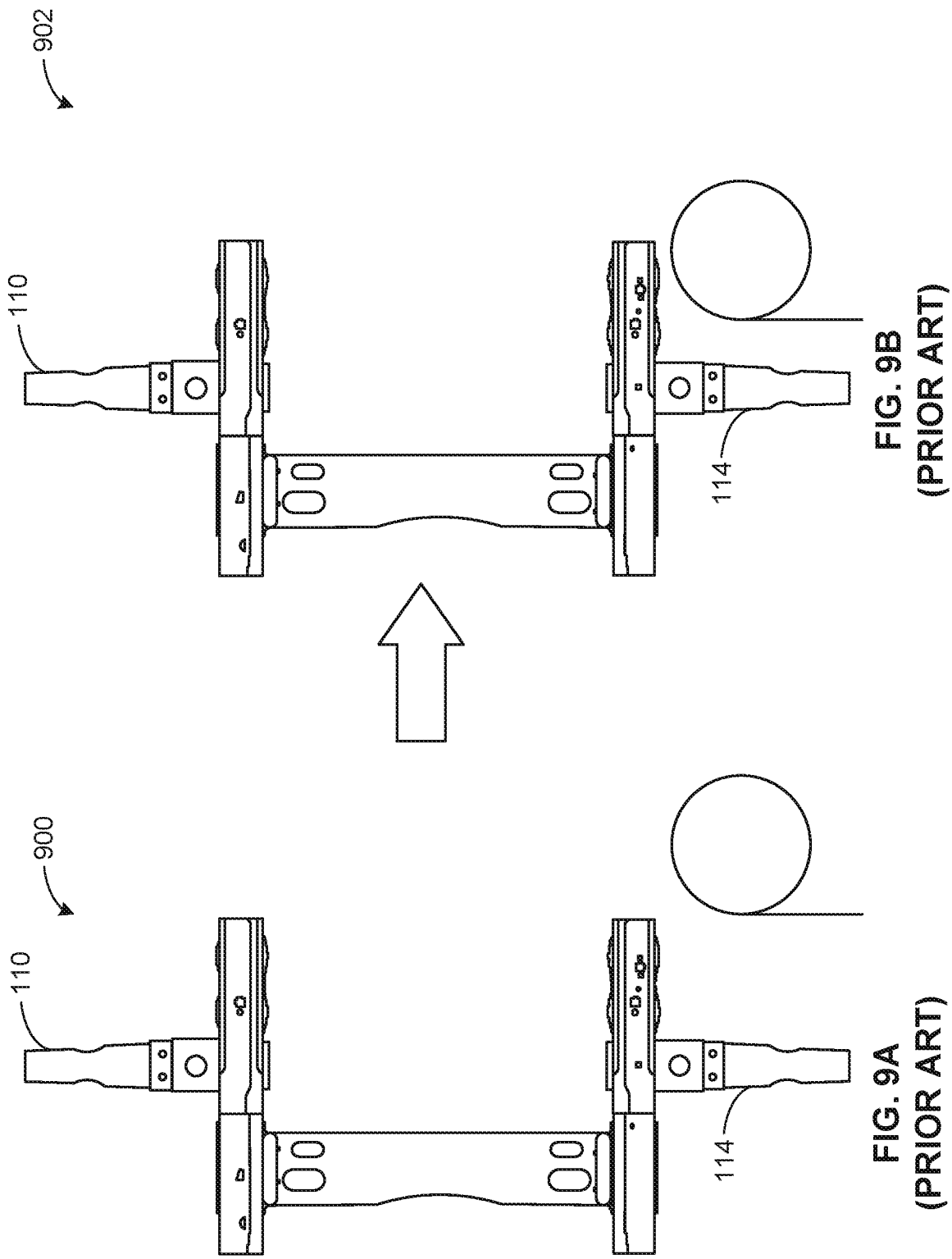

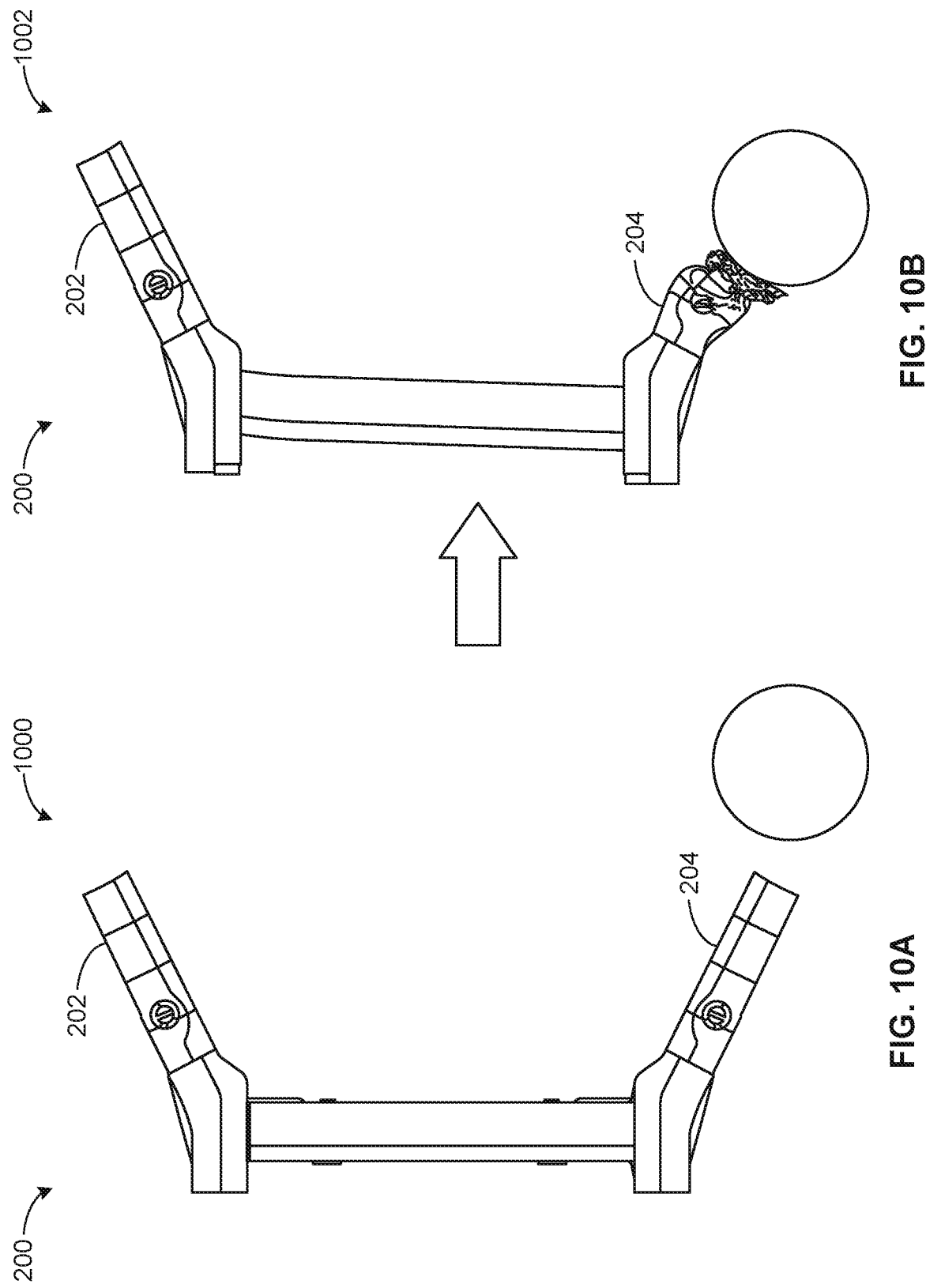

SPLAYED FRONT HORNS FOR VEHICLE FRAMES

FIELD OF THE DISCLOSURE

This disclosure relates generally to vehicle frames, and, more particularly, to splayed front horns for vehicle frames.

BACKGROUND

A vehicle frame, also referred to as a chassis, is the main supporting structure of the vehicle. Vehicle frames can be body-on-frame constructions where the body of the vehicle is separate from the frame, or unibody constructions, where the frame and the body are integrated. The vehicle frame supports mechanical components of the vehicle, and manages of the static and dynamic loads on the vehicle (e.g., the weight of passengers and cargo, torsional twisting due to uneven road surfaces, torque from a vehicle engine and/or transmission, impacts from collisions, etc.).

SUMMARY SECTION

An example apparatus disclosed herein includes a frame of a vehicle having a side rail directed in a longitudinal direction of the vehicle and a splayed front horn coupled to the side rail, the splayed front horn angled outward relative to the longitudinal direction of the vehicle, wherein the splayed front horn includes a first section and a second section, the first and second sections having different physical properties.

A frame of a vehicle includes a side rail directed in a longitudinal direction of the vehicle and a splayed front horn coupled to the side rail directed at an angle relative to the longitudinal direction of the vehicle, the splayed front horn having physical characteristics that vary along a length of the splayed front horn.

An example frame of a vehicle disclosed herein includes a splayed front horn disposed at a front end of the vehicle and angled relative to a longitudinal axis of the vehicle, the splayed front horn including a first section and a second section, the first section having physical properties different than physical properties of the second section.

BRIEF DESCRIPTION OF THE DRAWINGS

FIGS. 8A-8B are pre-impact and post-impact illustrations of a frontal impact on the frame of FIGS. 2-5.

FIGS. 9A-9B are pre-impact and post-impact illustrations of a small object rigid barrier (SORB) impact on the prior art vehicle frame design of FIG. 1.

FIGS. 10A-10B are pre-impact and post-impact illustrations of a small object rigid barrier (SORB) impact on the frame of FIGS. 2-5.

Figure 1:
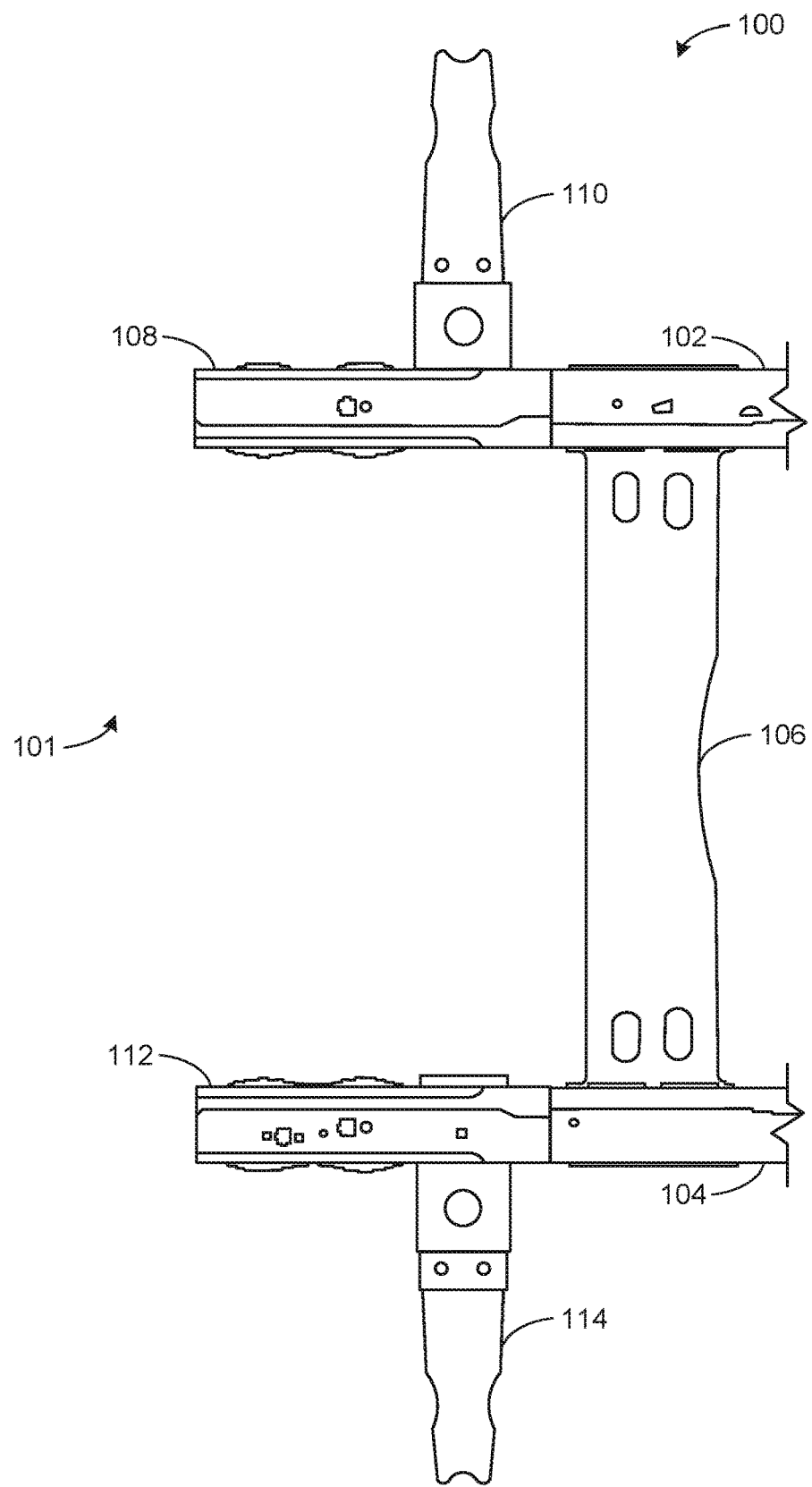
FIG. 1 is a top view of a design of a prior art vehicle frame.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A vehicle frame supports mechanical components of the vehicle and manages the static and dynamic loads that are applied to the vehicle. For example, during predominantly frontal impacts the vehicle frame absorbs energy and dissipates crash forces. In some examples, the vehicle frame manages other loads that are applied to the vehicle, such as the weight of passengers, cargo, and/or other components of the vehicle, the vertical and torsional stress caused by traveling over uneven driving surfaces, lateral forces caused by road conditions, wind, and/or steering the vehicle, torque from an engine and/or transmission of the vehicle, longitudinal tensile forces from acceleration or compression forces from braking, etc.

Known vehicle frames can include separate front horns and side members. In such known examples, the front horns and the side member(s) absorb energy from different types of impacts. For example, the front horns are configured to absorb energy during a frontal impact on the vehicle (e.g., collision with a wall, etc.). The side members may absorb energy from a small object rigid barrier (SORB) impact (e.g., an impact at a front of the vehicle on the left side or the right side only) and/or other side impacts.

Example vehicle frames disclosed herein include splayed front horns, which are angled relative to a longitudinal axis of the vehicle. In some examples disclosed herein, the splayed front horns are capable of absorbing energy from a frontal impact and a SORB impact. In some examples disclosed herein, the angle of the splayed front horns allows the splayed front horns to absorb energy from a frontal impact by deforming in a direction of the longitudinal axis of the vehicle. In some examples disclosed herein, the splayed front horns can further absorb energy from a SORB impact due to the angle of the splayed front horn by deforming along a central axis of the splayed front horn on a side affected by the SORB impact. In some examples disclosed herein, the cross-sectional area of the splayed front horn decreases as the splayed front horn extends towards the front of the vehicle.

In examples disclosed herein, the splayed front horns include a number of distinct sections having different physical characteristics (e.g., material properties, thickness, cross-sectional areas, etc.). For example, an outermost section (e.g., a section closest to a front of the vehicle, etc.) can have a reduced thickness and cross-sectional area relative to an innermost section (e.g., closer to a side rail of the vehicle, etc.). In such examples, the difference in thickness of the sections improves the ability of the splayed front horn to absorb energy during an impact. Additionally, in such examples, the difference in thickness of the sections prevents and/or reduces the likelihood of buckling of the splayed front horn when the vehicle experiences a frontal or SORB impact. In some examples disclosed herein, the sections may include different material properties (e.g., hardness, malleability, strength, etc.) to increase energy absorption (e.g., by improving the ability of the splayed front horn to collapse) and prevent buckling of the splayed front horn.

In some examples disclosed herein, the splayed front horns are composed of two stamped pieces. In some examples disclosed herein, a splayed front horn and/or each of the sections of the splayed front horn include two stamped pieces Taylor welded together. In other examples, the splayed front horn and/or each of the sections of the splayed front horn can be manufactured and/or coupled by any other suitable means.

FIG. 1 is a schematic illustration of a portion of a known vehicle frame 100. The portion of the known vehicle frame 100 illustrated in FIG. 1 is at a front end 101 of a vehicle. The known vehicle frame 100 includes a first side rail 102 and a second side rail 104 that extends from a front of the vehicle and to a rear of the vehicle. The first side rail 102 and the second side rail 104 are coupled via a cross member 106. The first side rail 102 is coupled to a first front horn 108 and a first side member 110. The second side rail 104 is coupled to a second front horn 112 and a second side member 114.

The side rails 102, 104 extend from the front end 101 of the vehicle to a rear axle of the vehicle. The side rails 102, 104 provide support for a vehicle body, front and rear axles, and/or other vehicle components. The side rails 102, 104 distribute loads applied to the vehicle (e.g., loads caused by cargo, uneven driving surfaces, collisions, etc.) throughout the frame 100. In the illustrated example of FIG. 1, the cross member 106 couples the side rails 102, 104 together and increases the strength of the vehicle frame 100. While only the cross member 106 is illustrated in FIG. 1, many prior art vehicle designs include a plurality of cross members. The side rails 102, 104 and the cross member 106 of the vehicle frame can be composed of steel, aluminum and/or any other suitable material(s). The side rails 102, 104 and the cross member 106 can be coupled together via fasteners (e.g., bolts, rivets, etc.), welds, press fits, and/or any suitable combination of fasteners and/or fastener techniques.

In the illustrated example of FIG. 1, the first front horn 108 extends from the first side rail 102 toward the front end 101 of the vehicle. Similarly, the second front horn 112 extends from the second side rail 104 toward the front end 101 of the vehicle. In the illustrated example of FIG. 1, the front horns 108, 112 are generally parallel and coaxial relative to the first side rail 102 and the second side rail 104, respectively. The front horns 108, 112 can be composed of steel, aluminum and/or any other suitable material(s). The front horns 108, 112 can be coupled to the side rails 102, 104 via fasteners (e.g., bolts, rivets, etc.), welds, press fits, or any combination thereof. When the vehicle experiences an impact at the front end 101 (e.g., a front impact, a SORB impact, etc.), the front horns 108, 112 of the known vehicle frame 100 absorb energy from the impact. In such examples, the front horns 108, 112 deflect and/or deform toward the side rails 102, 104 to absorb the energy from the frontal impact.

In the illustrated example of FIG. 1, the front horns 108, 112 are coupled to the side members 110, 114, respectively. In the illustrated example of FIG. 1, the side members 110, 114 extends generally perpendicularly to the front horns 108, 112 and the side rails 102, 104. When the vehicle experiences a side impact (e.g., an impact on the passenger or driver side of the vehicle) and/or a SORB impact, the side member(s) 110, 114 absorb energy from the impact. In such examples, the side members 110, 114 deflect (e.g., collapses, yields, etc.) toward the front horns 108, 112 to absorb the energy from the frontal impact. The side members 110, 114 can be composed of steel, aluminum and/or any other suitable material(s). In some examples, the side members 110, 114 are SORB tubes. In some examples, the vehicle frame 100 includes additional features (not illustrated) to mitigate SORB impacts. In such examples, the additional features add additional space and weight requirements to the known vehicle frame 100.

Figure 2:
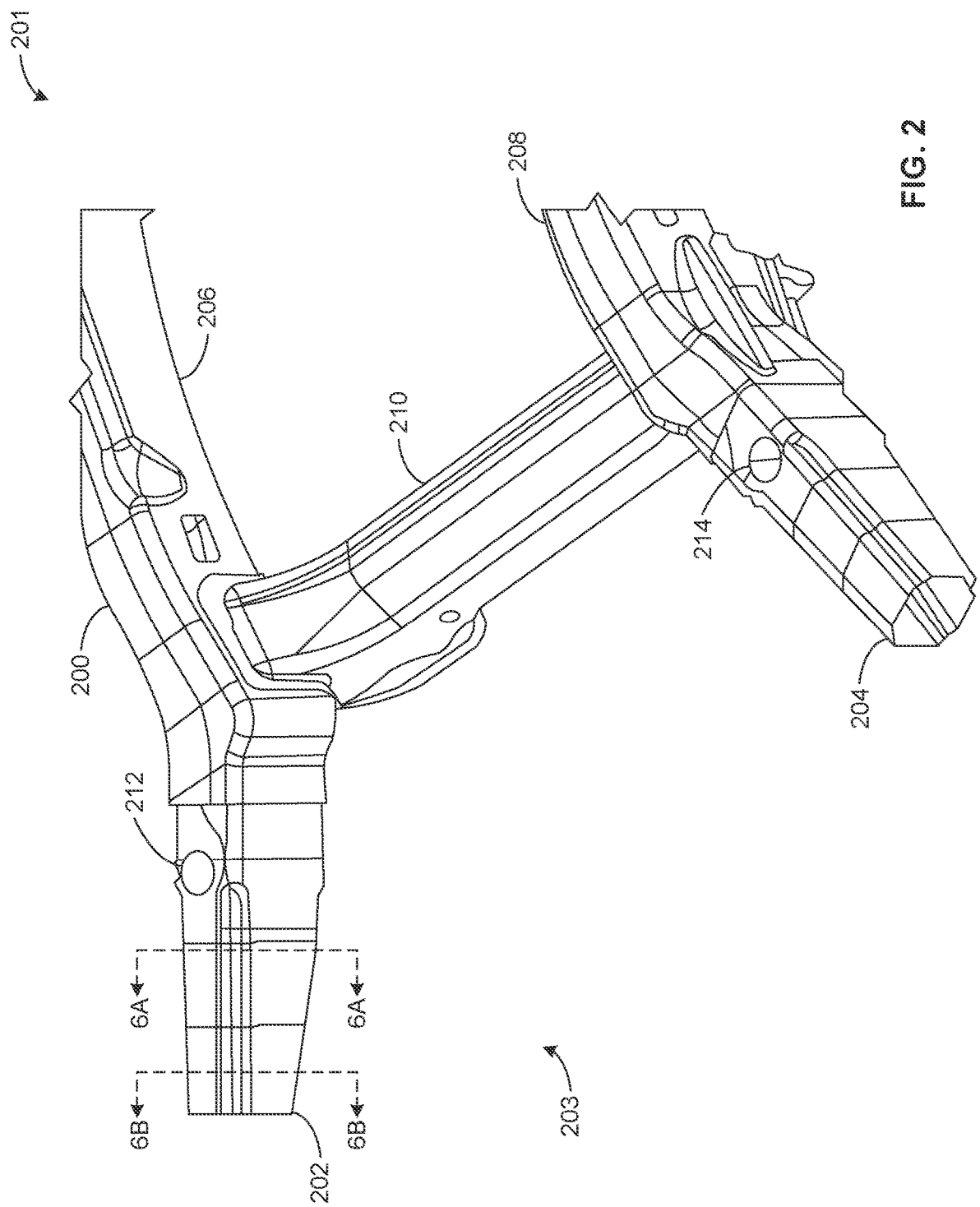
FIG. 2 is an isometric view of an example vehicle frame including splayed front horns.

FIG. 2 is an isometric illustration of an example front portion 201 of an example vehicle frame 200 including splayed front horns. In the illustrated example of FIG. 2, the vehicle frame 200 includes an example first splayed front horn 202 coupled to an example first side rail 206 and an example second splayed front horn 204 coupled to an example second side rail 208. The frame 200 further includes an example cross member 210. In the illustrated example of FIG. 2, the first splayed front horn 202 extends from the first side rail 206 toward the passenger side of a front end 203 and the second splayed front horn 204 extends from the second side rail 208 toward the passenger side of the front end 203. In the illustrated example of FIG. 2, the cross member 210 couples the first side rail 206 and the second side rail 208 together. A first example cross-sectional view of the first splayed front horn 202 taken along the line 6A-6A is described in greater detail below in conjunction with FIG. 6A. A second example cross-sectional view of the of the first splayed front horn 202 taken along the line 6B-6B is described in greater detail below in conjunction with FIG. 6B.

In the illustrated example of FIG. 2, the side rails 206, 208 are four-cornered, four-sided structural members and the splayed front horns 202, 204 are twelve-cornered, twelve-sided structural members. The splayed front horns 202, 204, the side rails 206, 208, and the cross member 210 can be composed of steel, aluminum and/or any other suitable material(s) and can be coupled together via any suitable means (e.g., welding, fasteners, press fits, etc.) In the illustrated example of FIG. 2, the splayed front horns 202, 204 include example bushing mounts 212, 214. In some examples, the bushing mountings 212, 214 enable the cabin (e.g., the cab, etc.) of a vehicle to be coupled to the frame 200. In other examples, the bushing mounts 212, 214 can be absent. In such examples, the cabin of the vehicle can be mounted to the frame 200 at any other suitable location.

Figure 3:
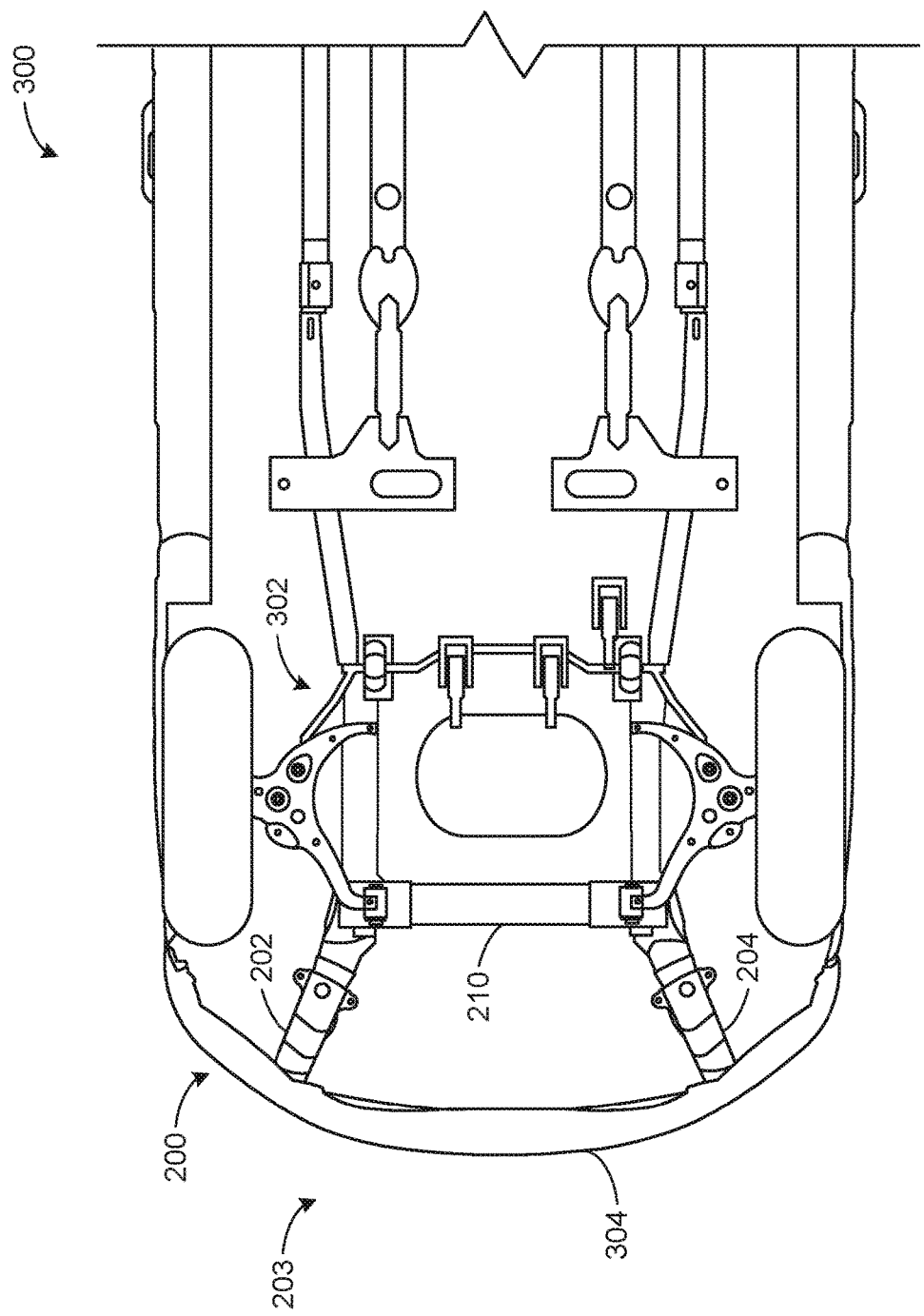
FIG. 3 is an illustration of an example vehicle including the frame of FIG. 2.

FIG. 3 is a schematic illustration of an example vehicle 300 having the example frame 200 of FIG. 2. In the illustrated example of FIG. 3, the vehicle 300 includes an example engine 302. In the illustrated example of FIG. 3, the frame 200 extends the length of the vehicle 300. The frame 200 supports the powertrain and the body of the vehicle 300. For example, the frame 200 can include coupling features (e.g., holes, etc.) that enable vehicle components to be coupled thereto. In the illustrated example of FIG. 2, the frame 200 absorbs the impact of a frontal, SORB, and side collisions to the vehicle 300. In the illustrated example of FIG. 3, the splayed front horns 202, 204 abut an example front surface 304 of the body of the vehicle 300. In other examples, there can be a gap between the splayed front horns 202, 204 and the front surface 304.

In the illustrated example of FIG. 3, the vehicle 300 is a car (e.g., a sedan, a coup, etc.). In other examples, the vehicle 300 can be any type of vehicle (e.g., a truck, a sports utility vehicle (SUV), a semi-trailer truck, a railed vehicle, an all-terrain vehicle (ATV), watercraft, construction equipment, farming equipment, etc.) In the illustrated example of FIG. 3, the engine 302 is coupled to the frame 200 rearward of the splayed front horns 202, 204 and sits above the cross member 210. In other examples, the engine 302 can be mounted in any suitable location of the vehicle 300 (e.g., between the front axle and the rear axle of the vehicle 300, in front of the front axle of the vehicle 300, behind the rear axle of the vehicle 300, etc.) In some examples, the splayed front horns 202, 204 can include features (e.g., holes, welding surfaces, etc.) that enable the engine 302 to be mounted thereto.

Figure 4:
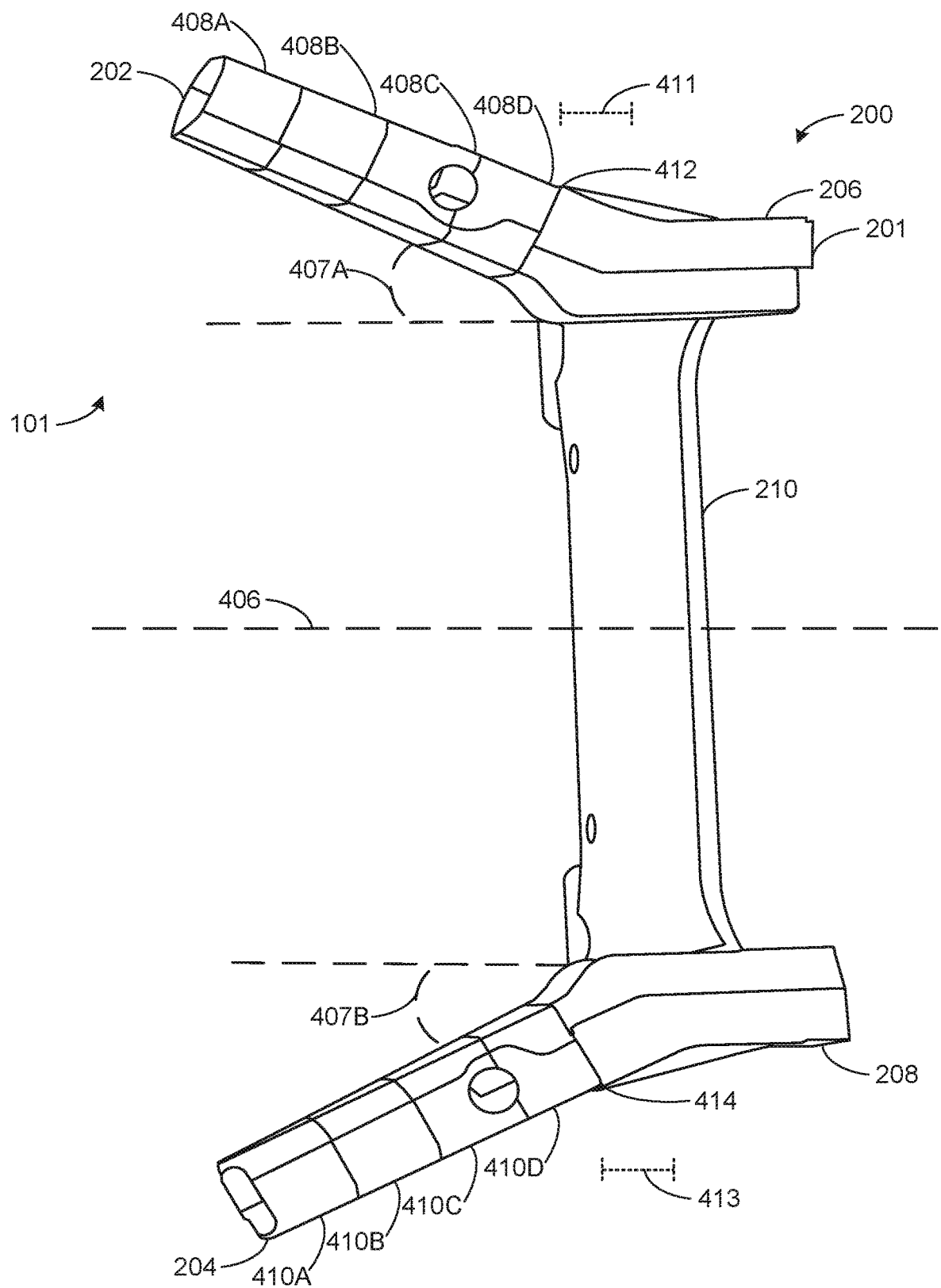
FIG. 4 is a top view of the vehicle frame of FIGS. 2-3.

FIG. 4 is a schematic illustration of the front portion 201 of the vehicle frame 200 including the splayed front horn design of FIGS. 2-3. In the illustrated example, the vehicle frame 200 includes the first splayed front horn 202, the second splayed front horn 204, the first side rail 206, the second side rail 208 and the cross member 210 of FIG. 2.

The side rails 206, 208 are four-sided structural members that extend the length of the frame 200. The first side rail 206 has a first front end 411 and the second side rail 208 has a second front end 413. In the illustrated example of FIG. 4, the front ends 411, 413 of the side rails 206, 208 are configured such that the splayed front horns 202, 204 do not have a co-linear relationship with the side rails 206, 208. For example, the first front end 411 is angled such that front horn 202 extends outwards towards the front passenger side of the vehicle 300. Similarly, the second front end 413 is angled such that the front horn 202 extends outwards towards the front driver side of the vehicle 300.

In the illustrated example of FIG. 4, the first splayed front horn 202 diverges outward from an example central axis 406 of the frame 200 at an example first angle 407A and the second splayed front horn 204 diverges outward from the central axis 406 at an example second angle 407B. In the illustrated example of FIG. 4, the central axis 406 is a longitudinal axis (e.g., an axis parallel to the direction of travel of the vehicle 300, etc.). In the illustrated example of FIG. 4, the frame 200 is symmetric about the central axis 406. In other examples, the frame 200 is asymmetric about the central axis 406. In the illustrated example, both of the angles 407A, 407B are 26°. In other examples, the angles 407A, 407B can have any other suitable value (e.g., 30°, 45°, 60°, etc.). In some examples, the angles 407A, 407B can have any suitable value between 25° and 60°. In some examples, the first angle 407A and the second angle 407B can have different values (e.g., the first angle 407A is 25° and the second angle 407B 30°, etc.).

In the illustrated example of FIG. 4, the first splayed front horn 202 includes an example first section 408A, an example second section 408B, an example third section 408C, and an example fourth section 408D. In the illustrated example of FIG. 4, the second splayed front horn 204 includes an example first section 410A, an example second section 410B, an example third section 410C, and an example fourth section 410D. In other examples, the splayed front horns 202, 204 can include any quantity of sections (e.g., two, three, five, etc.). In the illustrated example of FIG. 4, the cross-sectional area of the front horn 202 decreases as the front horn 202 extends towards the front end 203 of the vehicle 300 (e.g., the section 408A has a smaller cross-sectional area than the section 408B, the section 408B has a smaller cross-sectional area than the section 408C, etc.). Similarly, the cross-sectional area of the second splayed front horn 204 decreases as the second splayed front horn 204 extends towards the front end 203 of the vehicle 300 (e.g., the section 410A has a smaller cross-sectional area than the section 410B, the section 410B has a smaller cross-sectional area than the section 410C, etc.).

In the illustrated example of FIG. 4, the material thickness of the front horn 202 decreases as the front horn 202 extends towards the front end 203 of the vehicle 300 (e.g., the section 408A has a lesser material thickness than the section 408B, the section 408B has a lesser material thickness than the section 408C, etc.). Similarly, the material thickness of the second splayed front horn 204 decreases as the second splayed front horn 204 extends towards the front end 203 of the vehicle 300 (e.g., the section 410A has a lesser material thickness than the section 410B, the section 410B has a lesser material thickness than the section 410C, etc.). In some examples, the decreasing thickness and cross-sectional area of the first splayed front horn 202 causes the strength (e.g., the shear strength, the compressive strength, etc.) of each section 408A, 408B, 408C, 408D to comparatively decrease (e.g., the section 408A has a lower compression strength than the section 408B, the section 408B has a lower compressive strength than the section 408C, etc.). Similarly, the decreasing thickness and cross-sectional area of the second splayed front horn 202 causes the strength of each section 410A, 410B, 410C, 410D to comparatively decrease. In some examples, the decreasing strengths of the sections 408A, 408B, 408C, 408D and the sections 410A, 410B, 410C, 410D increases the ability of the splayed front horns 202, 204 to resist buckling during impact, respectively.

In some examples, the physical characteristics of the sections 408A, 408B, 408C, 408D of the first splayed front horn 202 and the sections 410A, 410B, 410C, 410D of the second splayed front horn 204 can vary. For example, some of all of the sections 408A, 408B, 408C, 408D and the corresponding sections 410A, 410B, 410C, 410D can have different physical characteristics (e.g., cross-sectional area and/or area, thicknesses, material properties, etc.)

The first splayed front horn 202 can be manufactured by welding two stamped parts together. In such examples, each of the stamped parts is composed of different gages of Tailor welded blanks (TWB). In some examples, each of the sections 408A, 408B, 408C, 408D can be composed of a different gage of TWB. In some examples, some or all of the sections 408A, 408B, 408C, 408D can be composed of the same gage of material blank. Likewise, the second splayed front horn 204 can be manufactured by welding two stamped parts together. In such examples, each of the stamped parts is composed of different gages of Tailor welded blanks (TWB). In some examples, each of the sections 410A, 410B, 410C, 410D can be composed of a different gage of TWB. In some examples, some or all of the sections 410A, 410B, 410C, 410D can be composed of the same gage of blank. In other examples, the first splayed front horn 202 and the second splayed front horn 204 can be manufactured by any other suitable method (e.g., extrusion, etc.).

In the illustrated example of FIG. 4, the first splayed front horn 202 is joined to the first side rail 206 at a first connection 412 and the second splayed front horn 204 is joined to the second side rail 208 at a second connection 414.

In some examples, the connections 412, 414 are twelve-cornered-to-four-cornered connections. Example implementations of the connections 412, 414 are disclosed in U.S. Pat. No. 9,187,127, which is hereby incorporated by reference in its entirety.

Figure 5:
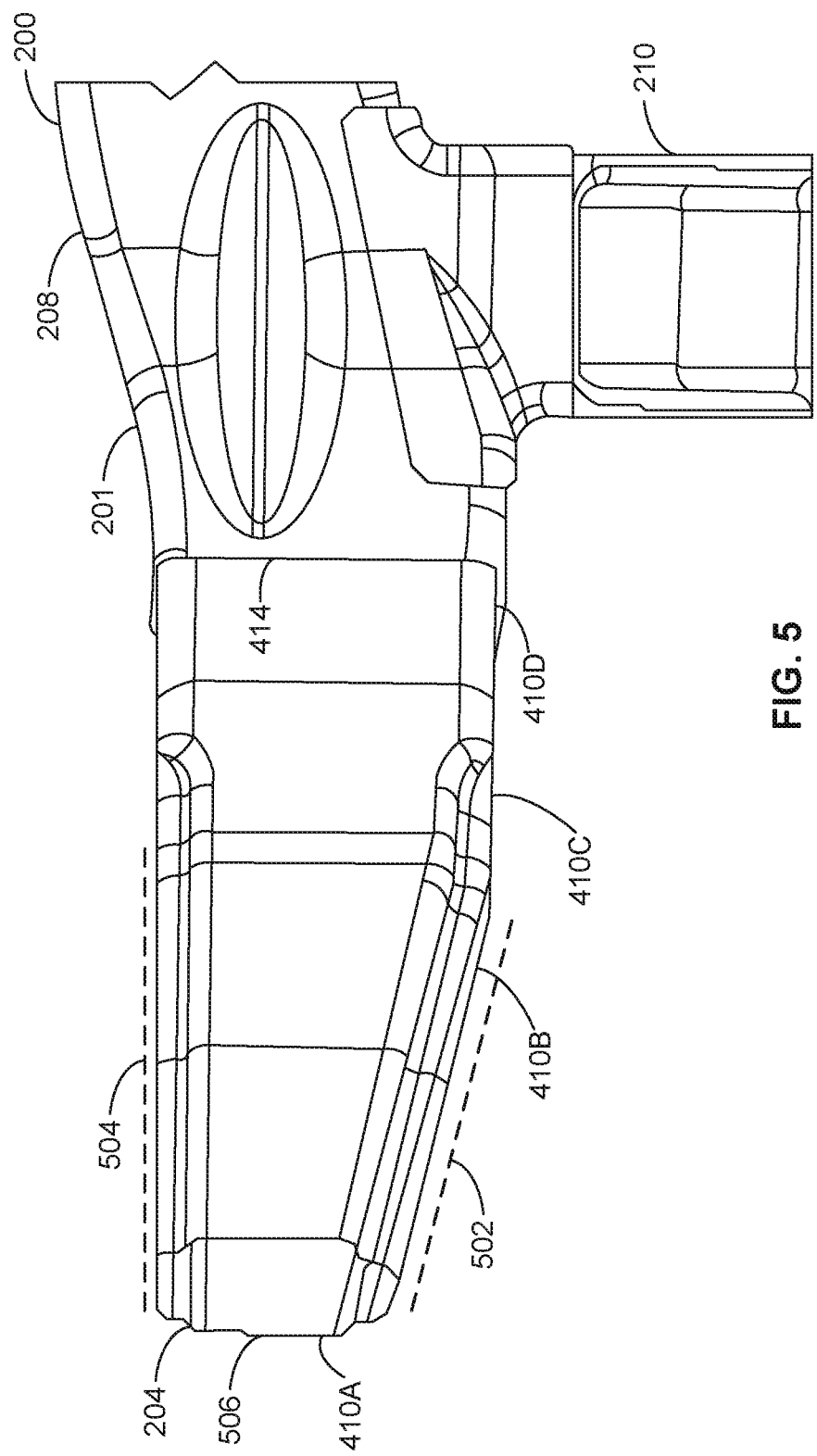
FIG. 5 is a side view of the frame of FIGS. 2-4.

FIG. 5 is a side view of the vehicle frame 200 including the second splayed front horn 204 of FIG. 2. In the illustrated example of FIG. 5, the first section 410A and the second section 410B of the front horn 204 have an example first profile 502 and an example second profile 504. In the illustrated example of FIG. 5, the first profile 502 is the lower profile of the first section 410A and the second section 410B and the second profile 504 is the upper profile the first section 410A and the second section 410B. In some examples, the profile of the first splayed front horn 202 is the same as the profile (e.g., the profiles 502, 504, etc.) of the second splayed front horn 204. In other examples, the profile of the first splayed front horn 202 can be different than the profile of the second splayed front horn 204.

In the illustrated example of FIG. 5, the first profile 502 slopes upwards away from the third section 410C and the fourth section 410D (e.g., away from the ground, etc.) and the second profile 504 continues parallel relative to the third section 410C and the fourth section 410D such that the cross-sectional area of the second splayed front horn 204 decreases as the splayed front horn 204 extends towards the front of the vehicle. In the illustrated example of FIG. 5, the cross-sectional area of an example front surface 506 of the second splayed front horn 204 is less than that of the cross-sectional area of the second splayed front horn 204 at the second connection 414. In some examples, the profiles 502, 504 can be reversed such that the second profile 504 extends downward away from the third section 410C and the fourth section 410D (e.g., towards the driving surface, etc.) and the first profile 502 continues parallel relative to the third section 410C and the fourth section 410D. In other examples, the second splayed front horn 204 can have any other suitable profile (e.g., the first profile 502 slopes upwards and the second profile 504 extends downward relative to the third section 410C and the fourth section 410D, both of the profiles 502, 504 continue parallel relative to the third section 410C and the fourth section 410D, etc.). In some examples, one or both of the third section 410C and the fourth section 410D can similarly slope upward or downward compared to the second rail 208.

In the illustrated example of FIG. 5, the cross member 210 extends beneath (e.g., closer to the ground, etc.) the side rail 208. In other examples, the cross member 210 can have any other suitable relationship with the side rail 208. For example, the cross member 210 can extend in the same plane as the side rail 208.

Figure 6A:
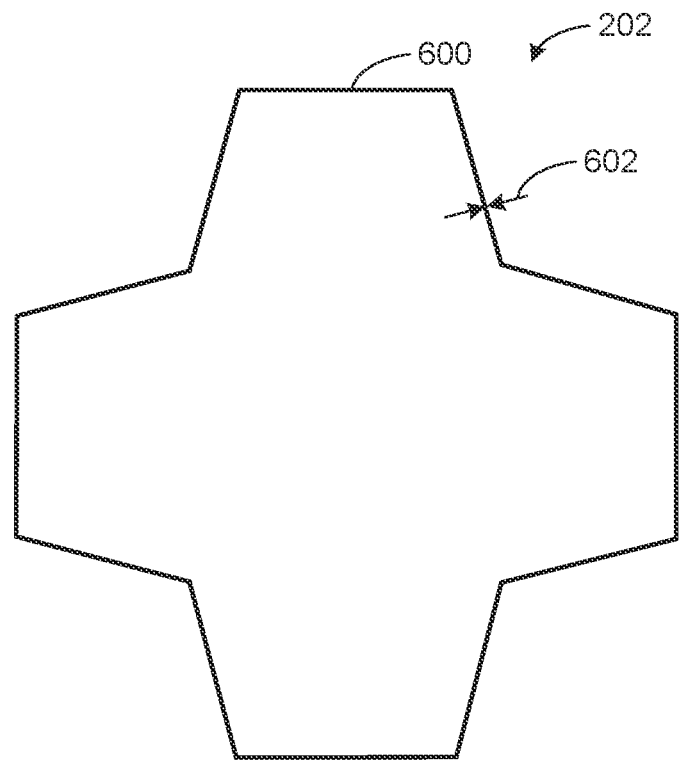
FIG. 6 is a FIGS. 6A-6B are cross-sectional views of the splayed front horn of FIGS. 2-4.
Figure 6B:
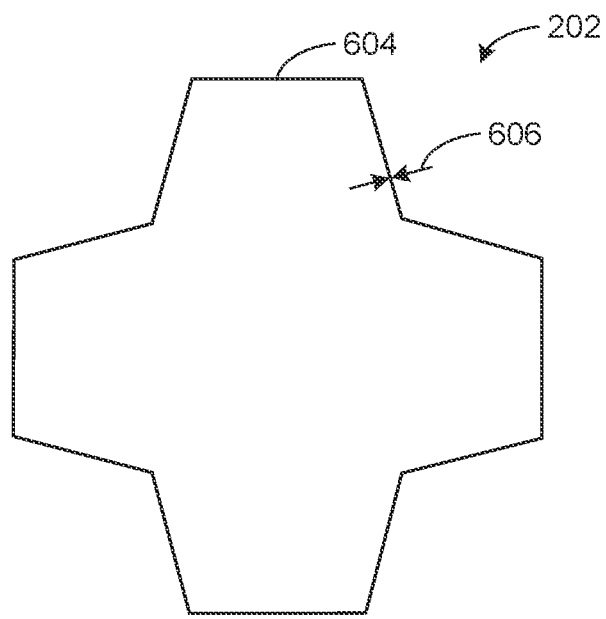

FIG. 6A is a schematic illustration of the cross-sectional view of the splayed front horn 201 of FIGS. 2 and 3 taken along the line 6A-6A of FIG. 2. In the illustrated example of FIG. 6A, the splayed front horn 201 has an example first cross-section 600 with an example first thickness 602. FIG. 6B is a schematic illustration of the cross-sectional view of the splayed front horn 201 of FIGS. 2 and 3 taken along the line 6B-6B of FIG. 2. In the illustrated example of FIG. 6B, the splayed front horn 204 has an example second cross-section 604 with an example second thickness 606. In the illustrated example of FIGS. 6A-6B, the cross-sections 600, 604 have twelve corners and twelve sides. In other examples, the length of the sides of the cross section 400 cross-sections 600, 604 and the angle between the sides of the cross section 400 cross-sections 600, 604 can vary. Example implementations of twelve corner cross-sections are disclosed in U.S. Pat. No. 8,641,129 which is hereby incorporated by reference in its entirety. In other examples, the cross-sections 600, 604 can have any suitable shape (e.g., octagonal, hexagonal, rectangular, circular, etc.). In the illustrated examples of FIGS. 6A, 6B, the thickness 602 of the portion of the front horn 202 corresponding to the first cross-section 600 (e.g., the second section 408B of FIG. 4) is greater than the thickness 606 of the portion of the front horn corresponding to the second cross-section 604 (e.g., the first section 408A of FIG. 4).

Figure 7B:
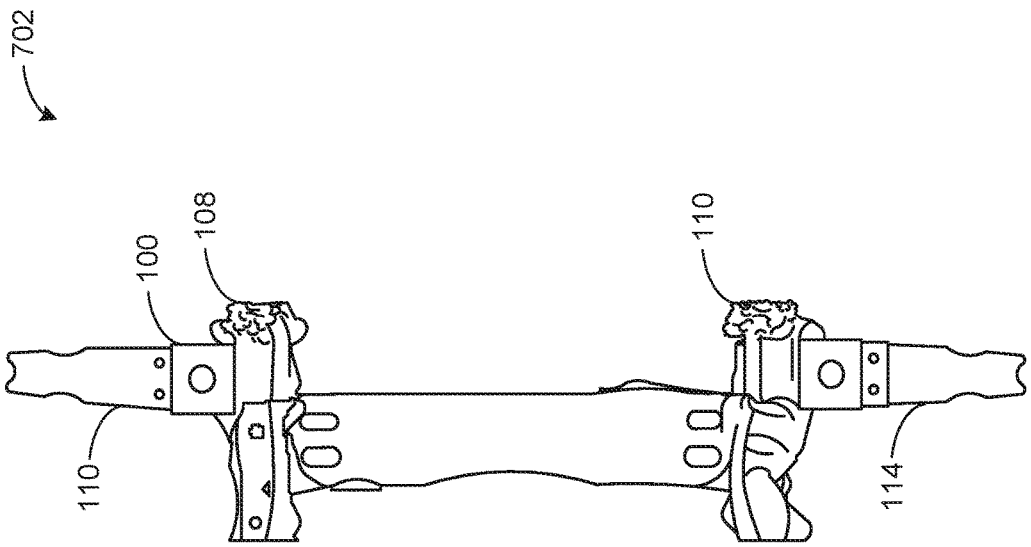
FIGS. 7A-7B are pre-impact and post-impact illustrations of a frontal impact on the prior art vehicle frame design of FIG. 1.
Figure 7A:
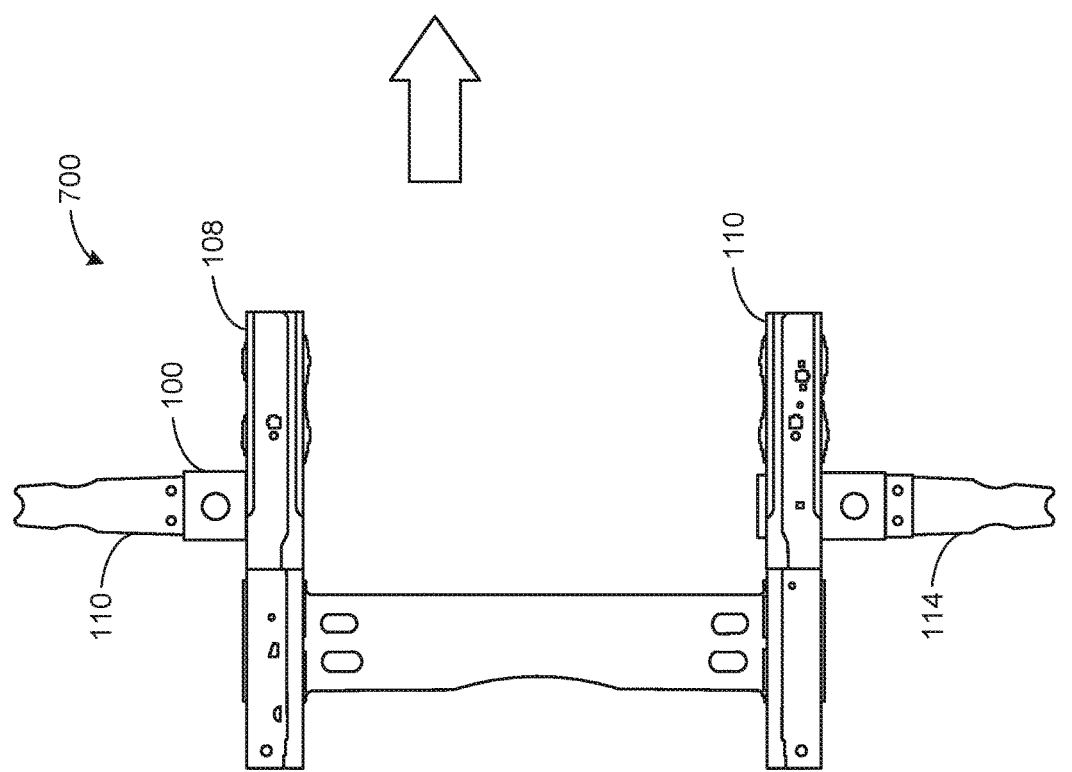

FIG. 7A is a top view of the known vehicle frame 100 of FIG. 1 in a pre-impact state 700 prior to a frontal impact. FIG. 7B is a top view of the known vehicle frame 100 of FIG. 1 in a post-impact state 702 after a frontal impact. In the illustrated examples of FIGS. 7A-7B, the known vehicle frame 100 is subjected to a uniform frontal impact (e.g., a collision with a wall, etc.) along the front end of the known vehicle frame 100. In the illustrated example of FIG. 7B, the splayed front horns 202, 204 have crumpled inward to absorb the energy of the impact and protect the occupants of the vehicle. In the illustrated example of FIGS. 7A-7B, the side members 110, 114 are not displaced in the post-impact state 702 relative to the pre-impact state 700. In other examples, the side members 110, 114 can be deflected towards the rear of the known vehicle frame 100 in the post-impact state 702.

FIG. 8A is a top view of the frame 200 of FIGS. 2-6 in a pre-impact state 800 prior to a frontal impact. FIG. 8B is a top view of the frame 200 of FIGS. 2-6 in a post-impact state 802 after a frontal impact. In the illustrated example of FIG. 8B, the splayed front horns 202, 204 have crumpled inward to absorb the energy of the impact and protect the occupants of the vehicle.

FIG. 9A is a top view of the known vehicle frame 100 of FIG. 1 in a pre-impact state 900 prior to a small object rigid barrier (SORB) impact on the driver side of the vehicle. FIG. 9B is a top view of the known vehicle frame 100 of FIG. 1 in a post-impact state 902 after a small object rigid barrier (SORB) impact on the driver side of the vehicle. In the illustrated example of FIG. 8B, the SORB impact is absorbed by components other than the known vehicle frame 100 (not illustrated). In other examples, the SORB impact can be absorbed by the side member 114. In such examples, the side member 114 can deflect rearward to absorb the impact of the SORB object.

FIG. 10A is a top view of the frame 200 of FIGS. 2-6 in a pre-impact state 1000 prior to a small object rigid barrier (SORB) impact on the driver side of the vehicle. FIG. 10B is a top view of the frame 200 of FIGS. 2-6 in a post-impact state 1002 after a small object rigid barrier (SORB) impact on the driver side of the vehicle. In the illustrated example of FIG. 10B, the splayed front horn 204 crumples rearward to absorb the energy of the SORB impact. In such examples, the frame 200 absorbs the SORB impact without the need of a side member and/or additional components specifically designed for absorbing SORB impacts. In the illustrated example of FIG. 10B, the physical characteristics of the front horn 204 (e.g., the physical characteristics of the sections 410A, 410B, 410C, 410D, etc.) prevent the front horn 204 from buckling during the SORB impact.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example methods, apparatus, and articles of manufacture have been disclosed for splayed front horn for vehicle frames. The splayed front horns enable both frontal and SORB impacts to be absorbed without additional components. In some examples, this reduces the complexity, cost, and weight of the frame design. In some examples, the splayed front horns also offer superior energy absorption when compared to prior art frame designs.

Splayed front horns for vehicle frames are disclosed herein. Further examples and combinations thereof include the following: Example 1 includes an apparatus comprising a frame of a vehicle having a side rail directed in a longitudinal direction of the vehicle and a splayed front horn coupled to the side rail, the splayed front horn angled outward relative to the longitudinal direction of the vehicle, wherein the splayed front horn includes a first section and a second section, the first and second sections having different physical properties.

Example 2 includes the apparatus of example 1, wherein the splayed front horn is a twelve-cornered member.

Example 3 includes the apparatus of example 2, wherein the side rail is a four-cornered member.

Example 4 includes the apparatus of example 3, further including a third section to couple the twelve-cornered member and the four-cornered strengthening member via a twelve-cornered-to-four-cornered connection.

Example 5 includes the apparatus of example 1, wherein the first section has a first thickness and the second section has a second thickness greater than the first thickness.

Example 6 includes the apparatus of example 5, further including a third section of the splayed front horn having a third thickness greater than the first thickness and the second thickness.

Example 7 includes the apparatus of example 1, wherein the splayed front horn absorbs energy when the vehicle experiences a frontal impact and when the vehicle experiences a small object rigid barrier impact.

Example 8 includes the apparatus of example 1, wherein the first section includes two stamped pieces and the second section includes two stamped pieces.

Example 9 includes the apparatus of example 1, wherein the splayed front horn is angled outward twenty-five to sixty degrees relative to the longitudinal direction of the vehicle.

Example 10 includes a frame of a vehicle comprising a side rail directed in a longitudinal direction of the vehicle, and a splayed front horn coupled to the side rail directed at an angle relative to the longitudinal direction of the vehicle, the splayed front horn having physical characteristics that vary along a length of the splayed front horn.

Example 11 includes the frame of example 10, wherein the splayed front horn has a first thickness at a first location on the splayed front horn adjacent the side rail and a second thickness at a second location on the splayed front horn spaced from the side rail, the first thickness greater than the second thickness.

Example 12 includes the frame of example 10, wherein the splayed front horn absorbs energy when the vehicle experiences a frontal impact and when the vehicle experiences a small object rigid barrier impact.

Example 13 includes the frame of example 10, wherein the splayed front horn is angled outward twenty-five to sixty degrees relative to the longitudinal direction of the vehicle.

Example 14 includes the frame of example 10, wherein the side rail is a four-cornered member and the splayed front horn is a twelve-cornered member.

Example 15 includes the frame of example 14, wherein the splayed front horn includes a twelve-cornered-to-four-cornered connection to couple the splayed front horn to the side rail.

Example 16 includes a frame of a vehicle comprising a splayed front horn disposed at a front end of the vehicle and angled relative to a longitudinal axis of the vehicle, the splayed front horn including a first section and a second section, the first section having physical properties different than physical properties of the second section.

Example 17 includes the frame of example 16, wherein the first section has a first thickness and the second section has a second thickness greater than the first thickness.

Example 18 includes the frame of example 17, further including a third section of the splayed front horn having a third thickness greater than the first thickness and the second thickness.

Example 19 includes the frame of example 16, wherein the splayed front horn absorbs energy when the vehicle experiences a frontal impact and when the vehicle experiences a small object rigid barrier impact.

Example 20 includes the frame of example 16, wherein the splayed front horn is angled outward twenty-five to sixty degrees relative to the longitudinal axis of the vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a frame of a vehicle including:
   a side rail directed in a longitudinal direction of the vehicle; and
   a splayed front horn coupled to the side rail, the splayed front horn angled outward relative to the longitudinal direction of the vehicle, the splayed front horn having a first side profile parallel to a driving surface of the vehicle, the splayed front horn having a second side profile sloping upward relative to the driving surface, wherein the splayed front horn includes a plurality of joined sections, the plurality of joined sections including:
a first section having a first thickness; and
a second section having a second thickness different than the second thickness, the first section joined to the second section.

2. The apparatus of claim 1, wherein the splayed front horn is a twelve-cornered member.

3. The apparatus of claim 2, wherein the side rail is a four-cornered member.

4. The apparatus of claim 3, further including a third section to couple the twelve-cornered member and the four-cornered member via a twelve-cornered-to-four-cornered connection.

5. The apparatus of claim 1, wherein the first thickness is greater than the second thickness.

6. The apparatus of claim 5, further including a third section of the splayed front horn having a third thickness less than the second thickness.

7. The apparatus of claim 1, wherein the splayed front horn absorbs energy when the vehicle experiences a frontal impact and when the vehicle experiences a small object rigid barrier impact.

8. The apparatus of claim 1, wherein the first section includes two stamped pieces and the second section includes two stamped pieces.

9. The apparatus of claim 1, wherein the splayed front horn is angled outward twenty-five to sixty degrees relative to the longitudinal direction of the vehicle.

10. A vehicle comprising:
a side rail directed in a longitudinal direction of the vehicle; and
a splayed front horn coupled to the side rail directed at an angle relative to the longitudinal direction of the vehicle, the splayed front horn having a first side profile parallel to a driving surface of the vehicle, the splayed front horn having a second side profile sloping upward relative to the driving surface, the splayed front horn including a plurality of joined sections, the plurality of joined section including:
a first section having a first cross-sectional area and a first thickness, the first section at a first location adjacent the side rail; and
a second section having a second cross-sectional area and a second thickness, the second section at a second location spaced from the side rail, the first cross-sectional area greater than the second cross-sectional area, the first section joined to the second section.

11. The vehicle of claim 10, wherein the splayed front horn has a first wall thickness at the first location and a second wall thickness at the second location, the first wall thickness greater than the second wall thickness.

12. The vehicle of claim 10, wherein the splayed front horn absorbs energy when the vehicle experiences a frontal impact and when the vehicle experiences a small object rigid barrier impact.

13. The vehicle of claim 10, wherein the splayed front horn is angled outward twenty-five to sixty degrees relative to the longitudinal direction of the vehicle.

14. The vehicle of claim 10, wherein the side rail is a four-cornered member and the splayed front horn is a twelve-cornered member.

15. The vehicle of claim 14, wherein the splayed front horn includes a twelve-cornered-to-four-cornered connection to couple the splayed front horn to the side rail.

16. A frame of a vehicle comprising:
a side rail; and
a splayed front horn disposed at a front end of the vehicle and angled relative to a longitudinal axis of the vehicle, the splayed front horn including a plurality of joined sections, the plurality of joined sections including:
a first section having a first thickness; and
a second section having a second thickness, the splayed front horn having a first side profile parallel to a driving surface of the vehicle, the splayed front horn having a second side profile sloping upward relative to the driving surface, the first section joined to the second section.

17. The frame of claim 16, wherein the first section has a first wall thickness and the second section has a second wall thickness greater than the first wall thickness.

18. The frame of claim 17, further including a third section of the splayed front horn having a third wall thickness greater than the first wall thickness and the second wall thickness.

19. The frame of claim 16, wherein the splayed front horn absorbs energy when the vehicle experiences a frontal impact and when the vehicle experiences a small object rigid barrier impact.

20. The frame of claim 16, wherein the splayed front horn is angled outward twenty-five to sixty degrees relative to the longitudinal axis of the vehicle.

* * * * *